United States Patent Office 3,419,608
Patented Dec. 31, 1968

3,419,608
SPHERULITIC CRYSTAL AGGREGATE OF MONOSODIUM GLUTAMATES MONHYDRATE AND METHOD OF PREPARING THE SAME
Yurio Kawamura, Tokyo, Taketoshi Ando, Kanagawa-ken, Kuniharu Takenouchi, Tokyo, Yoshiki Sakata, Kanagawa-ken, and Hiromasa Maruyama, Tokyo, Japan, assignors to Ajinomoto Co., Inc., Tokyo, Japan
No Drawing. Continuation-in-part of application Ser. No. 331,896, Dec. 19, 1963. This application Mar. 16, 1965, Ser. No. 440,297
Claims priority, application Japan, Dec. 25, 1962, 37/57,494
6 Claims. (Cl. 260—534)

ABSTRACT OF THE DISCLOSURE

Spherulitic crystal aggregates of monosodium L-glutamate monhydrate are obtained by crystallizing monosodium L-glutamate from aqueous methanol containing 60–95% methanol by weight at a temperature at which the solution is supersaturated with the glutamate. The crystals quickly dissolve and are of uniform size when crystallized from 75–95% methanol.

---

This application is a continuation-in-part of our copending application Ser. No. 331,896, filed on Dec. 19, 1963, and now abandoned.

This invention relates to a spherulitic aggregate of monosodium glutamate monohydrate crystals, and to a method of preparing the spherulitic aggregate.

When monosodium glutamate monohydrate is crystallized from a solution thereof by conventional methods, the crystals have the shape of prisms or needles. The optically active L-isomer of monosodium glutamate monohydrate is widely used as a seasoning agent. The known crystals do not dissolve in aqueous liquids as rapidly as would be desirable for a seasoning material. This shortcoming is particularly noted when the glutamate is added to pickles or to soy bean sauce.

Monosodium glutamate monohydrate crystals are also sprinkled on dishes from shaker jars having a perforated top. The needle shaped crystals do not pass through the top of the jar when they are elongated transversely of the perforations.

The object of the invention is the provision of monosodium glutamate monohydrate crystals which are free of the afore-described shortcomings.

More specifically, the invention aims at monosodium glutamate monohydrate in the form of crystals which are radipdly soluble in aqueous media, and which flow freely through openings in the top of a shaker jar.

We have found that monosodium glutamate monohydrate forms spherulitic crystal aggregates when crystallized from aqueous methanol solutions in which the methanol amounts to at least 60 percent, and to not more than 95 percent, of the solvent.

It is well known that monosodium glutamate monohydrate is less soluble in alcohols than in water, and it is conventional to crystallize the glutamate from its aqueous solutions by gradually adding an alcohol to the aqueous solution. The known alcohol addition method does not yield spherulitic crystals. Such crystals are obtained by crystallization of the glutamate from a supersaturated solution in aqueous methanol having a methanol content of 60 to 95 percent. Crystallization takes place with or without agitation of the supersaturated solution. It is much more rapid than crystallization by the known alcohol addition method.

The influence of the methanol concentration in the solvent on the nature of the monosodium gluatmate monohydrate crystals is more important than that of other process variables. Typically, the material produced with stirring from a supersaturated solution of monosodium glutamate monohydrate in an aqueous methanol containing 95 to 98% methanol by weight is amorphous. From a solvent containing 75 to 95% methanol, there are obtained perfectly or nearly perfectly spherical crystal aggregates of uniform size. When the methanol concentration in the solvent is reduced to 60 to 75%, the aggregates are still nearly spherical, but they vary in size over a wider range. The crystals obtained at a methanol concentration of less than 60% are fine needles but not spherical aggregates.

When supersaturated glutamate solutions in aqueous methanol of the preferred concentration are left to crystallize spontaneously wtihout agitation, the crystals form on the container walls, and the aggregates are hemispherical.

The density of crystal packing in the aggregates can be influenced by controlling the temperature during crystallization from the supersaturated solution. If the temperature is lowered during crystallization, the individual crystals are more tightly packed in the aggregates than during isothermal crystallization.

A supersaturated solution of optically active monosodium glutamate monohydrate in aqueous methanol may be prepared in any desired manner for the method of this invention. It is prepared most simply by mixing the necessary amount of methanol with an aqueous solution of the glutamate. When the glutamate is impure, the crystal aggregates formed may be deformed, and the crystal yield may be reduced. It is not usually necessary, however, to use highly purified monosodium glutamate monohydrate in the method of the invention.

Although the crystal aggregates formed appear to be spheres or hemispheres when viewed with the naked eye, they show typical spherulite structure under the microscope. Fine needle-like crystals are radially aggregated. The specific surface area of the spherulites is much larger than that of conventionally prepared crystals of the same material. This fact is believed to account for the more rapid dissolution of the spherulitic monosodium glutamate monohydrate apparent from the following table.

The table lists the time (seconds) and the distance from a water surface (centimeters) at which crystals of the invention and conventional prismatic crystals become invisible when dropped from the surface. The crystals were of the same size, passing through an ASTM No. 20 sieve, and being retained on a No. 40 sieve. They were dropped into a glass cylinder 60 millimeters in diameter and 1100 millimeters high. Ten runs were made with each crystal type.

TABLE

| Run No. | Spherulitic crystals | | Prismatic crystals | |
|---|---|---|---|---|
| | Seconds | Centimeters | Seconds | Centimeters |
| 1 | 17 | 35 | 35 | 70 |
| 2 | 13 | 20 | 33 | 65 |
| 3 | 16 | 30 | 30 | 50 |
| 4 | 17 | 35 | 35 | 85 |
| 5 | 17 | 35 | 33 | 65 |
| 6 | 18 | 40 | 28 | 60 |
| 7 | 20 | 40 | 31 | 65 |
| 8 | 18 | 35 | 32 | 65 |
| 9 | 16 | 30 | 35 | 75 |
| 10 | 20 | 45 | 28 | 55 |
| Average | 17 | 34.5 | 32 | 65.5 |

The closest packed spherulitic crystals of the invention have a specific volume of 1.76 to 1.95 whereas optically active monosodium glutamate monohydrate in closest packed spherical crystals has a theoretical specific volume of 0.83. The rapid dissolution of the spherulitic crystals of the invention is believed due primarily to the microporosity of the aggregates indicated by these figures.

The solubility of optically active monosodium glutamate monohydrate in aqueous methanol decreases with methanol concentration. The solubility of the glutamate varies with methanol concentration in the solvent at 50° C. approximately as follows:

| Methanol concentration in solvent, weight percent | 0 | 10 | 20 | 30 | 40 | 60 | 80 | 100 |
|---|---|---|---|---|---|---|---|---|
| Dissolved glutamate, weight percent | 48 | 37 | 28 | 20 | 14 | 6 | 2 | 0 |

The presence of 50% methanol in the aqueous solvent thus reduces solubility to about one-sixth. The glutamate is insoluble in pure methanol.

The method of the invention employs as a solvent an aqueous methanol solution containing between 60 and 95 percent methanol by weight. The amount of optically active monosodium glutamate monohydrate remaining in the mother liquor after crystallization is thus very small. As much as 85 to 90% of the dissolved material is collected in the form of crystals.

Crystallization from a solvent high in methanol results in the formation of spherulitic aggregates as at a single stroke. A slow growth from seed crystals or fine crystal nuclei is not observed. The time required for crystal growth to any specific size is about $\frac{1}{15}$ to $\frac{1}{20}$ of that required at the same temperature with the known method of gradually adding alcohol to an aqueous solution.

Because of the high alcohol content of the system, the viscosity of the mother liquor is low. The crystals are readily separated from the mother liquor by filtration, and are dried easily. This is another advantage over the known method. The invention will be further illustrated by specific examples, but it will be understood that it is not limited thereto.

Example 1

A supersaturated solution of monosodium L-glutamate monohydrate was prepared in a three-necked flask of two liter capacity equipped with a mercury sealed stirrer, a reflux condenser, and a thermometer. 120 grams monosodium glutamate monohydrate were heated in 220 milliliters water until they dissolved, and the solution was carefully mixed with 1500 milliliters methanol in such a manner as to avoid localized supersaturation, but quickly enough to complete the addition of the methanol before crystallization started. The resulting solution had a temperature of about 55° C. and was supersaturated with respect to the glutamate. It was initially clear and was stirred vigorously until spherical crystalline aggregates of the glutamate were formed.

The mixed solvent system contained 84.5% methanol by weight. Within 20 minutes 87.5% of the dissolved glutamate was crystallized. This amounted to 98% of the yield to be expected.

The crystalline bodies obtained were almost completely spherical. Their size distribution is evident from the following sieve analysis:

| ASTM No. | Percent |
|---|---|
| 16 to 20 | 1.6 |
| 20 to 40 | 85.1 |
| 40 to 50 | 12.0 |
| 50 to 80 | 1.3 |

Example 2

210 grams monosodium L-glutamate monohydrate were dissolved in 560 milliliters water by heating in the flask described in Example 1, and the solution was mixed with 1500 milliliters methanol. The resulting clear supersaturated solution had a temperature of about 55° C. It was vigorously stirred. Nearly spherical crystal aggregates were formed while the solution temperature was gradually reduced to 25° C.

The methanol concentration in the solvent was 70.2% by weight. The yield of crystals after 90 minutes was 80%. The crystals had the following size distribution:

| ASTM No. | Percent |
|---|---|
| 16 to 20 | 33.8 |
| 20 to 40 | 55.5 |
| 40 to 50 | 9.0 |
| 50 to 80 | 1.1 |

Example 3

125 grams of monosodium L-glutamate monohydrate of 96.5% purity were dissolved at ambient temperature in 215 milliliters water in the flask described in Example 1. The solution was mixed with 1,000 milliliters hot methanol to make it supersaturated. The supersaturated solution was stirred vigorously at about 50° C. and spherical crystal aggregates were formed.

The methanol concentration in the solvent system was 82.3% by weight. The crystallization yield was 78% in a one hour crystallization period.

The impurities in the glutamate mainly consisted of other amino acids.

While this invention has been described with particular reference to specific embodiments, it is to be understood that it is not limited thereto, but is to be construed broadly and restricted solely by the scope of the appended claims.

What is claimed is:

1. A method of preparing spherulitic crystal aggregates of optically active monosodium glutamate monohydrate which comprises preparing a solution of said monosodium glutamate monohydrate in an aqueous methanol solution containing between 60 and 95 percent methanol by weight, the solution being supersaturated with respect to said monosodium glutamate monohydrate, and initially free from crystals of said monosodium glutamate, and permitting said monosodium glutamate monohydrate to crystallize from said supersaturated solution.

2. A method as set forth in claim 1, wherein said supersaturated solution is being agitated while said monosodium glutamate monohydrate crystallizes therefrom.

3. A method of preparing spherulitic crystal aggregates of optically active monosodium glutamate monohydrate which comprises:
   (a) dissolving said monosodium glutamate monohydrate in an aqueous medium; and
   (b) mixing the aqueous solution obtained with methanol,
      (1) the amount of said methanol being sufficient to make the resulting mixed solution supersaturated with respect to said monosodium glutamate monohydrate, and
      (2) sufficient to make the concentration of methanol in said mixed solution not less than 60 percent and not more than 95 percent by weight,
      (3) said methanol being mixed with said aqueous solution at a rate sufficient to reach said concentration of methanol in said solution substantially before said monosodium glutamate crystallizes from said mixed solution,
      (4) whereby monosodium glutamate monohydrate crystallizes in spherulitic aggregates from said mixed solution.

4. A method as set forth in claim 3, wherein said mixed solution is being agitated while said monosodium monohydrate crystallizes.

5. A method as set forth in claim 3, wherein said medium essentially consists of water, and said monosodium glutamate is dissolved by heating the same with an amount of water insufficient to dissolve said monosodium glutamate at ambient temperature.

6. As a manufacture, crystalline, optically active monosodium glutamate monohydrate in the form of a spherulitic porous body of needle-like radially aggregated crystals prepared by the method of claim 1.

References Cited

UNITED STATES PATENTS

| 2,306,646 | 12/1942 | Shildneck | 260—534 |
| 3,278,572 | 10/1966 | Frump | 260—534 XR |
| 3,360,554 | 12/1967 | Yamomoto et al. | 260—534 |

LORRAINE A. WEINBERGER, *Primary Examiner.*

A. P. HALLUIM, *Assistant Examiner.*